948,341.
G. W. PERRY, Jr.
MOTOR VEHICLE.
APPLICATION FILED JULY 21, 1906.
Patented Feb. 8, 1910.
4 SHEETS—SHEET 1.
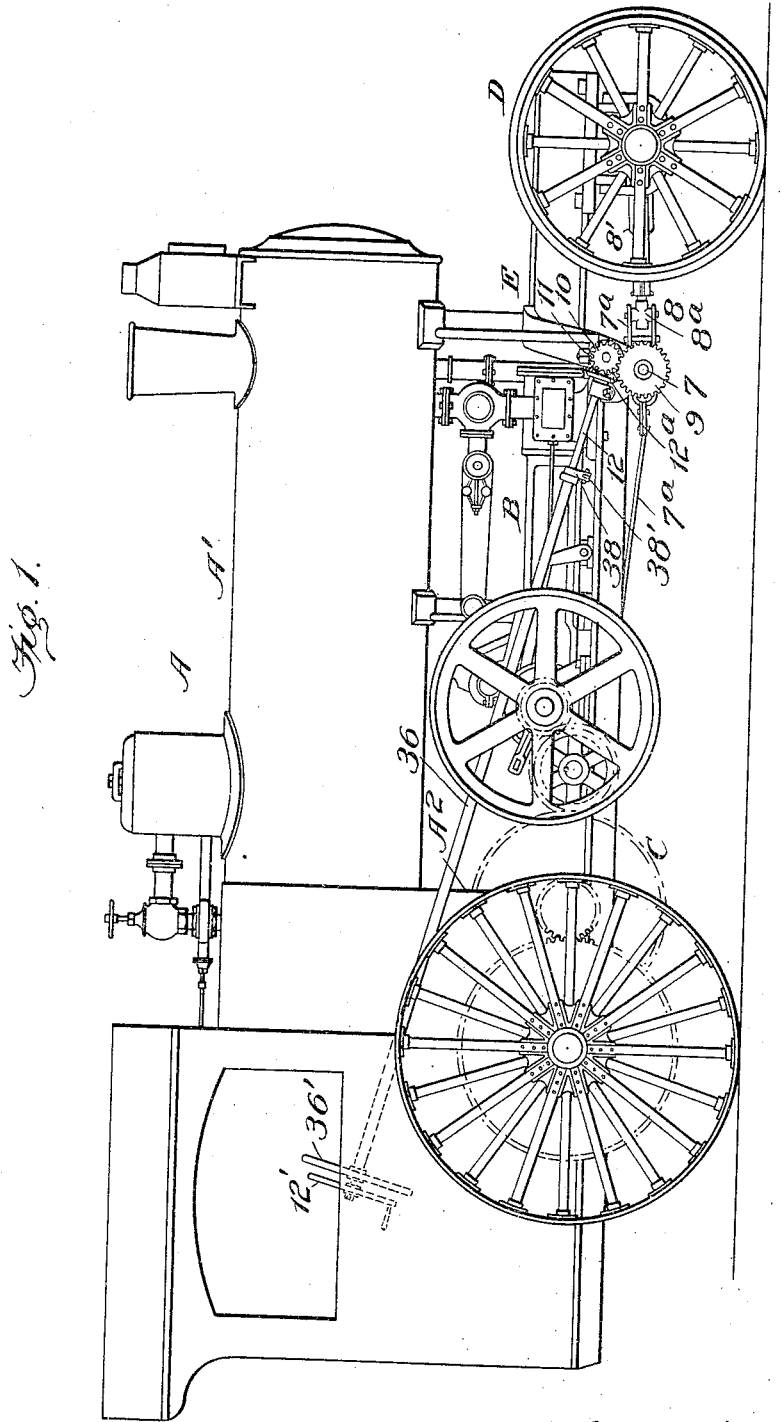
Witnesses
Edwin L. Bradford
N Curtis Limmond
Inventor
George W. Perry, Jr.
By
H. H. Bliss
Attorney G. W. PERRY, JR.
MOTOR VEHICLE.
APPLICATION FILED JULY 21, 1906.
948,341.
Patented Feb. 8, 1910.
4 SHEETS—SHEET 2.
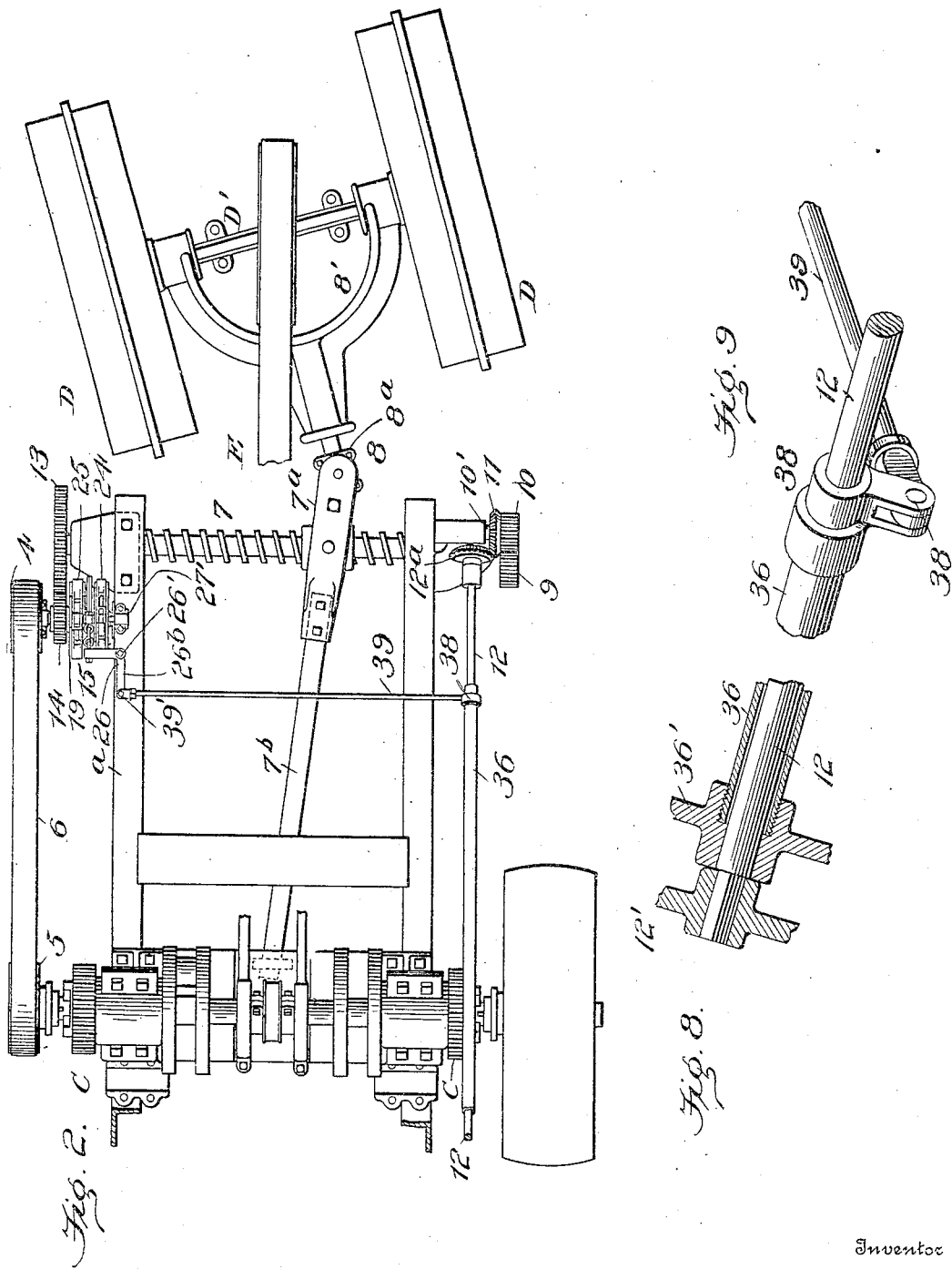

G. W. PERRY, Jr.
MOTOR VEHICLE.
APPLICATION FILED JULY 21, 1906.
948,341.
Patented Feb. 8, 1910.
4 SHEETS—SHEET 3.
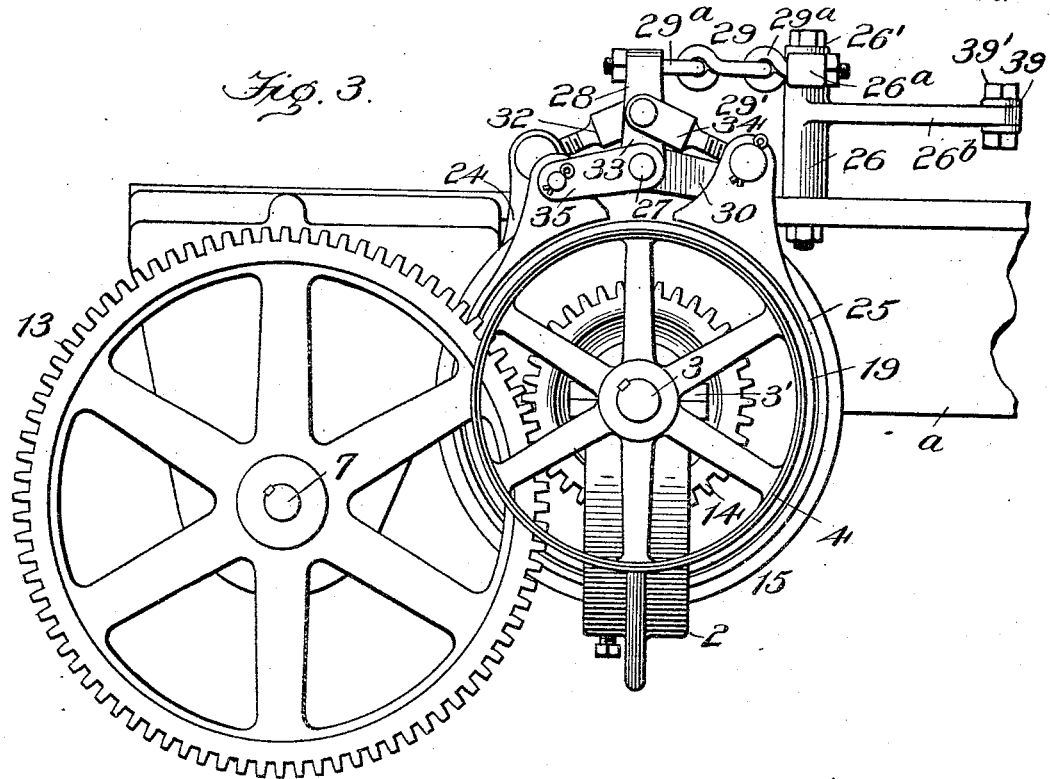
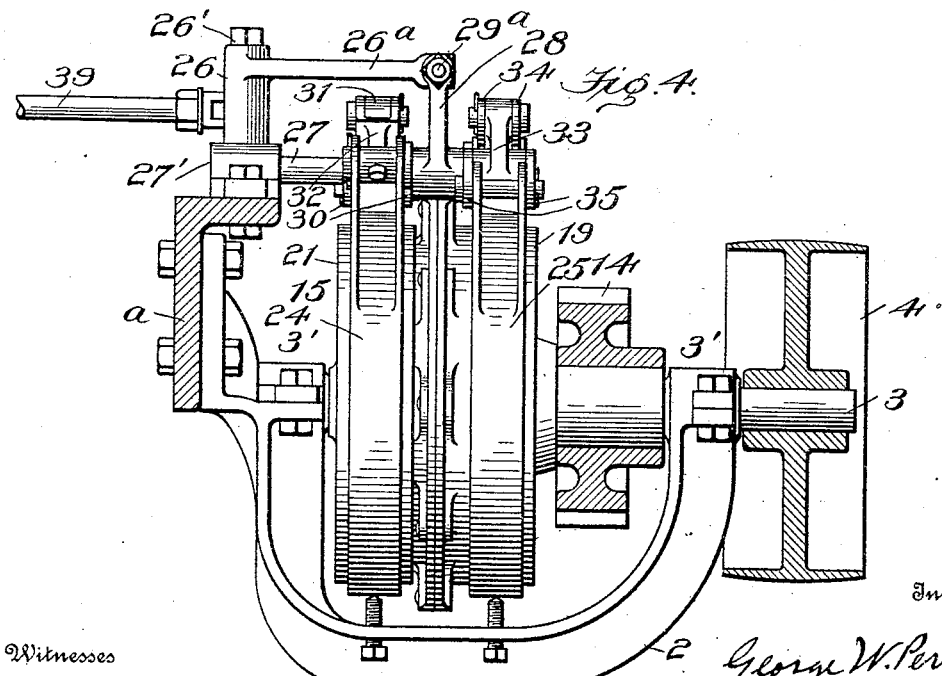
Witnesses
Edwin L. Bradford
N. Curtis Lammond
Inventor
George W. Perry, Jr.
By H. H. Bliss
Attorney G. W. PERRY, Jr.
MOTOR VEHICLE.
APPLICATION FILED JULY 21, 1906.
948,341.
Patented Feb. 8, 1910.
4 SHEETS—SHEET 4.
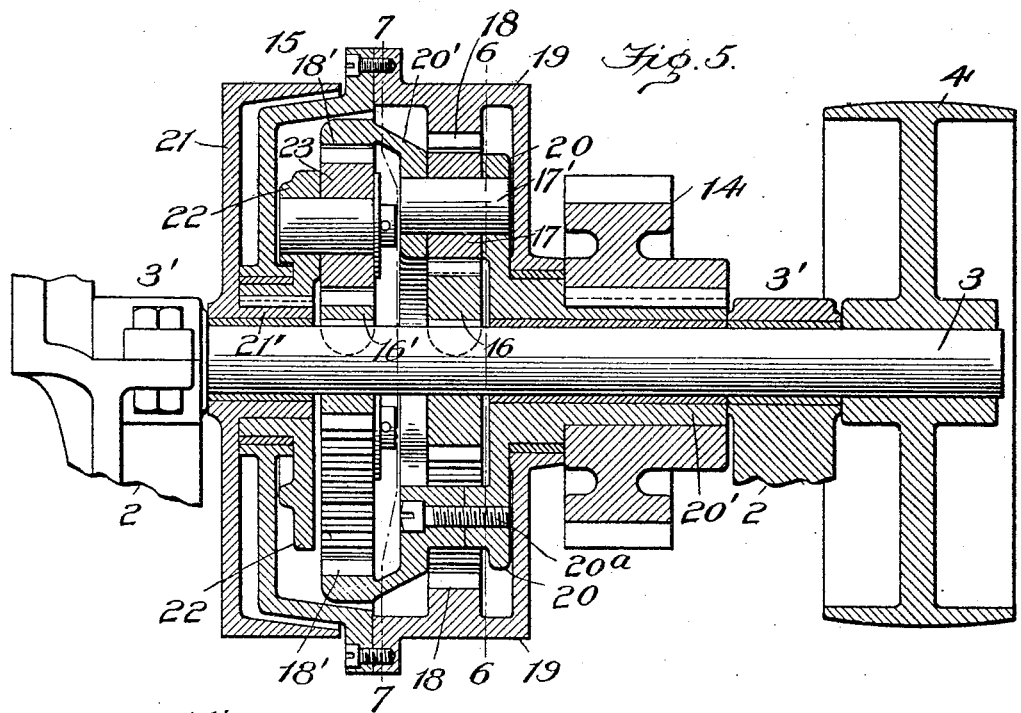
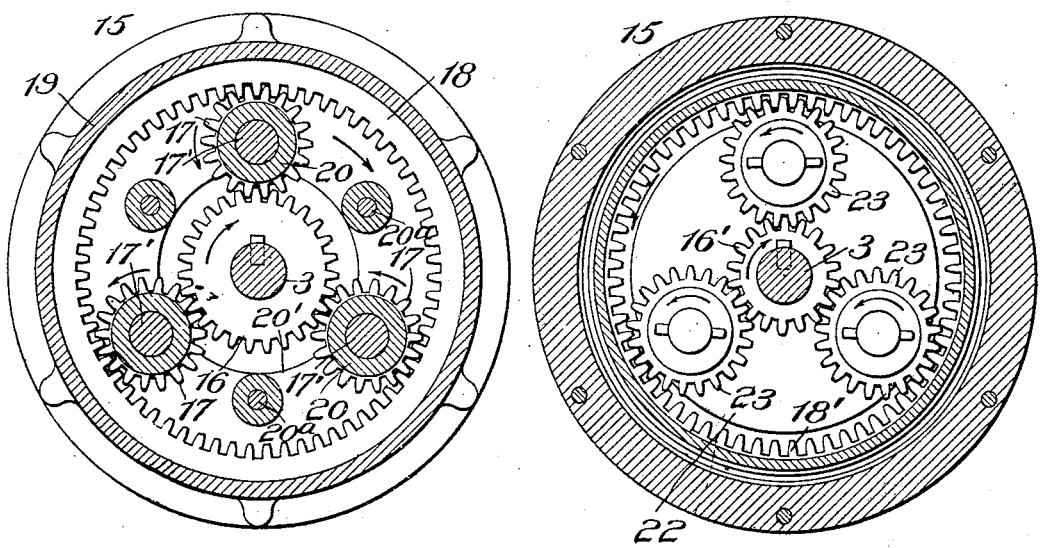
Witnesses
Edwin L. Bradford
N. Curtis Lammond
Inventor
George W. Perry, Jr.,
By H. H. Bliss
Attorney

UNITED STATES PATENT OFFICE.

GEORGE W. PERRY, JR., OF PEORIA, ILLINOIS, ASSIGNOR, BY MESNE ASSIGNMENTS, TO AVERY COMPANY, A CORPORATION OF ILLINOIS.

MOTOR-VEHICLE.

948,341.  Specification of Letters Patent.  Patented Feb. 8, 1910.

Application filed July 21, 1906. Serial No. 327,185.

*To all whom it may concern:*

Be it known that I, GEORGE W. PERRY, Jr., a citizen of the United States, residing at Peoria, in the county of Peoria and State of Illinois, have invented certain new and useful Improvements in Motor-Vehicles, of which the following is a specification, reference being had therein to the accompanying drawing.

This invention relates to steering mechanism for motor vehicles.

It has for its object to produce a steering gear arranged to receive power for turning the steering wheels of the vehicle from the motor on the vehicle.

For the purposes of illustration, I have shown my improvement as applied to the steering wheels of a traction engine.

Figure 1 is a side elevation of a traction engine embodying my improvements. Fig. 2 is a plan view of the frame on which the engine and steering mechanism is mounted. Fig. 3 is a side elevation of the steering mechanism and a portion of the engine looking at the opposite side of the engine from that shown in Fig. 1. Fig. 4 is a front view of a portion of the power transmitting mechanism of the steering gear, the vehicle frame being shown in section. Fig. 5 is an axial cross section of the planetary gearing. Fig. 6 is a view in cross section in a plane perpendicular to the shaft 3, on the line 6—6 of Fig. 5. Fig. 7 is a view in cross section in a plane perpendicular to the shaft 3, on the line 7—7 of Fig. 5. Fig. 8 is a cross section, and Fig. 9 is a perspective view of portions of the rotating steering bar.

In the drawings—A represents as an entirety a traction engine of any well known type having a boiler A', a fire box A², an engine or engines B, power transmitting mechanism C interposed between the engine or engines and the traction driving wheels, and front steering wheels D. In the traction engine shown in the drawing the engines proper and power transmitting mechanism are arranged upon a frame E of any suitable construction, supported at its front end upon the said steering wheels. As far as the parts just described are concerned and their relative arrangement, it will be understood that they are employed in the present instance simply for illustration purposes, as my invention may be applied to any style of motor vehicle.

2 represents a bearing frame secured at its inner end in any suitable manner to the adjacent longitudinal side bar *a* of the engine frame.

3 is a shaft arranged transversely of the engine frame and having its axis parallel to the axis of the crank shaft and mounted at either end in bearings 3', 3', supported by the bracket bearing frame 2. The outer end of the said shaft extends through the outer bearing 3' and has secured to it a belt pulley 4. 5 is a belt pulley arranged in longitudinal alinement with the said pulley 4 and rigidly secured to one end of the crank shaft of the engine or engines. 6 is a power transmitting belt connecting the said belt pulley.

The front steering wheels D are mounted on an axle D' suitably connected to the front end of the engine frame.

7 is a steering shaft arranged transversely of the frame and suitably mounted near either end in bearings carried by the frame. 8 indicates as an entirety suitable mechanism interposed between said shaft 7 and the steering shaft D' by means of which, when the shaft 7 is turned in one direction, power is transmitted through said mechanism 8 to turn the steering shaft D' in one direction about the axis of its pivotal connection with the engine frame, and to turn the said steering shaft in the opposite direction, when a reverse rotation is given to the said shaft 7. For the purposes of illustration I have shown the shaft 7 as screw threaded and having a screw-threaded collar or nut fitted thereto and pivotally connected on a vertical axis to a yoke 7ª.

8' is a yoke connected at its front ends to the steering axle D' and at its rear end to the front ends of the yoke 7ª by a universal joint 8ª, the forward element of which is telescopically fitted into the yoke 8'.

7ᵇ is a guide arm connected to the yoke 7ª and extending rearwardly therefrom and mounted at its rear end at a point in the longitudinal center of the engine frame.

9 is a gear wheel rigidly secured to one end of the shaft 7.

10 is a gear wheel meshing with the gear wheel 9 and secured to a countershaft 10' suitably mounted on the frame. 11 is a bevel pinion secured to said shaft 10'.

12 is a steering shaft arranged longitudinally of the traction engine, mounted in suitable bearings and having a steering wheel 12' secured to its upper rear end and arranged within easy reach of the operator's cab on the locomotive. 12$^a$ is a bevel gear rigidly secured to the lower front end of the said steering shaft and in mesh with the bevel gear 11.

I do not make any claims to the arrangement of parts of the steering mechanism just described, the same, so far as I am aware, being the invention of one Mr. William N. Springer and shown and described in his application filed Dec. 21, 1904, Serial No. 237,859.

13 is a gear wheel secured to the opposite end of the steering shaft 7 from the gear wheel 9, just described.

14 is a gear wheel loosely mounted on the shaft 3 and arranged to mesh with the gear wheel 13. 15 indicates as an entirety a system of planetary gearing interposed between the shaft 3 and the said gear wheel 14 mounted thereon and adapted to transmit power from the said shaft to operate the said gear 14 in opposite directions, as desired.

16 is a gear wheel rigidly secured to the shaft 3 and meshing with a plurality of idler gears 17 interposed between it and an internal gear 18 carried by a planetary drum 19.

20 is a gear-carrying plate having an outwardly extending sleeve 20' loosely mounted upon the shaft 3 and having rigidly secured to its outer end the gear wheel 14. The idler gears 17 are mounted on pins or stub shafts carried by the said gear plate.

21 is a planetary drum loosely mounted on the inner end of the shaft 3 and having an outwardly extending sleeve 21' to which a gear-carrying plate 22 is rigidly secured. 23 are idler gears pivotally mounted on the said gear-carrying plate 22 and interposed between a gear wheel 16' rigidly secured to the shaft 3 and an internal gear 18' carried by a plate 20' which is secured to the plate 20 by means of screws 20$^a$.

24 is a friction band encircling the planetary drum 21, and 25 is a friction band encircling the planetary drum 19.

26 is a bell crank lever pivotally mounted at 26' on a vertical axis to a side bar $a$ of the engine frame.

27 is a rock shaft mounted at its inner end in a bearing 27' on the engine frame and extending outwardly therefrom above the planetary drums 19 and 21.

28 is an arm rigidly secured to the rock shaft 27 at points between the friction bands 24 and 25 and extending upwardly therefrom.

29 is a universal link connection between the outer end of the arm 26$^a$ of the bell crank lever 26 and the upper end of the rocker arm 28. In the drawings I have shown this as comprising a chain link 29' connected at either end to I-bolts 29$^a$ extending through the ends of the rocker arm and the bell crank lever arm.

30, 30, are links pivotally connected to one end of the friction band 24 and having their other ends loosely mounted on the rock shaft 27. 31 is an upwardly extending arm rigidly secured to the said rock shaft 27 at its lower end and pivotally connected at its upper end to the front end of a link 32, the rear end of which is adjustably connected to the opposite end of the friction band 24 to that to which the links 30 are connected.

33 is a rocker arm rigidly connected at its lower end to the rock shaft 27 and having its upper end connected by a link 34 to the end of the friction band 25 on the opposite side of the rock shaft 27 to the end of the band 24 to which the link 32 is connected.

35 are links loosely mounted at their front ends on the rock shaft 27 and having their rear ends pivotally connected to the adjacent end of the band 25.

It will be understood that when the rock shaft 27 is rotated in clockwise direction, as looked at in Fig. 3, the band 24 will be contracted so as to tightly engage the periphery of the drum 21 and hold it stationary so that power will be transmitted to drive the gear wheel 14 in one direction, while when the rock shaft 27 is rotated in the opposite direction the friction band 25 will engage and hold stationary the planetary drum 19 and power will be transmitted to rotate the gear wheel 14 in the opposite direction.

36 is a tubular shaft or sleeve mounted upon the steering shaft 12. At its upper end adjacent to the steering wheel 12' it has secured to it a hand wheel 36' by means of which it may be rotated in either direction. 38 is a lever arm rigidly secured at one end to the lower end of said shaft and having its opposite end pivotally connected at 38' to a transversely arranged rod or bar 39 the other end of which is pivotally connected at 39' to the rear end of the bell crank lever arm 26$^b$. Rotation of the hand wheel 36' in one direction will cause the clamping of the friction band 24 to the planetary drum 21, and its rotation in the opposite direction will cause the clamping of the friction band 25 to the planetary drum 19.

When the operator desires to control the turning of the steering wheels D by power from the engine or engines, he needs only to rotate the hand wheel 36' in the direction necessary to cause the turning of the steering wheels as desired, when power will be transmitted from the engine crank shaft through the belt 6, pulley 4, shaft 3, planetary gear, and gears 14 and 13 to rotate the screw shaft 7 as desired.

Where traction engines of considerable weight are employed, and when such engines encounter soft and rough roads, it is desirable that they be provided with a steering mechanism which is power-actuated from the motor or motors on the vehicle, rather than to rely upon the strength of the operator as applied to ordinary hand-wheel-controlled steering mechanism. It is not always necessary in the operation of such machines to utilize the motive power driven steering devices, and I have therefore provided that they should be auxiliary to the well known and customary form of steering mechanism.

It will be noted that the friction bands and planetary drums of the planetary gearing system afford a yielding power transmitting device between the vehicle motor and the steering wheels. This is of considerable importance in that it insures that no sudden and severe shocks or strains will be imparted either from the motor to the steering wheels or vice versa, and at the same time it allows of connecting up the motor to the steering wheels through a friction driving mechanism so that the power can be applied to the steering wheels as gradually and slowly as desired, and without sudden shock.

As hereinbefore set forth the transmitting mechanism shown in the drawings between the rotatable shaft 7 and the steering wheels, is employed simply for the purpose of illustration, as any suitable and well known form of steering mechanism may be substituted in lieu thereof. In the drawings I have shown the steering wheels mounted on a transversely arranged steering axle of the type generally employed in traction engines, but it will be understood that steering wheels each mounted on a spindle turnable about a vertical axis, such as is commonly employed in motor vehicles or automobiles, may as well be employed.

What I claim is—

1. In a steering gear for motor vehicles, the combination of a motor frame, a motor thereon, vehicle-supporting and driving wheels, power transmitting mechanism interposed between said motor and said driving wheels, and suitable steering wheels, of power transmitting mechanism interposed between said motor and said steering wheels and including positively acting power transmitting means, and means in addition to said positively acting power transmitting means for frictionally controlling the same.

2. In a steering gear for motor vehicles, the combination with a suitable motor frame, a motor thereon, and suitable steering wheels, of power transmitting mechanism interposed between said motor and said steering wheels, and including a planetary gearing adapted to turn said steering wheels in one direction or another.

3. In a steering gear for motor vehicles, the combination with an engine frame, an engine thereon, vehicle-supporting and driving wheels, power transmitting mechanism interposed between said engine and said driving wheels, and suitable steering wheels, of a train of power transmitting devices interposed between said engine and said steering wheels adapted to turn the said steering wheels in one direction or another, and having in said train a planetary gearing.

4. In a steering gear for motor vehicles, the combination with an engine frame, an engine thereon, vehicle-supporting and driving wheels, power transmitting mechanism interposed between said engine and said driving wheels, and suitable steering wheels, of a train of power transmitting devices interposed between said engine and said steering wheels, and having in said train a set of planetary gears for turning said steering wheels in one direction, and a set of planetary gears for turning said wheels in the opposite direction.

5. In a motor vehicle, the combination with an engine frame, an engine thereon, vehicle-supporting and driving wheels, power transmitting mechanism interposed between said vehicle-supporting and driving wheels and said engine, suitably mounted steering wheels, a rotatable steering bar having a hand wheel within reach of the operator on the vehicle, and suitable power transmitting connections between said steering bar and the steering wheels for turning the steering wheels in one direction or another, of auxiliary steering mechanism interposed between said engine and said steering wheels, a sleeve mounted on said steering bar and having a hand wheel arranged adjacent to the hand wheel on the steering bar, and suitable connections between said sleeve and said auxiliary steering mechanism adapted to control the operation of the latter through the rotation of the said sleeve.

6. In a steering gear for motor vehicles, the combination with an engine frame, an engine thereon, and steering wheels, of a rotatable shaft, connections between the said shaft and steering wheels, planetary gears connected with the engine, means for connecting the said gears with the shaft, and means for operating the planetary gears to transmit power in one direction or another to said shaft.

7. In a steering mechanism, the combination with an engine on the engine frame, and steering wheels, of a bearing frame mounted on the engine frame, a shaft mounted in said bearing frame and arranged to receive power from the engine, planetary gears mounted on said shaft and arranged to rotate in opposite directions, connections between the steering wheels and the planetary gears, and means for operating said planetary gears, and means for operating said planetary gears to turn the steering wheels in one direction or the other.

8. In a steering mechanism, the combination with an engine frame, an engine, and steering wheels, of a shaft arranged to receive power from the engine, planetary gears mounted thereon and arranged to rotate in opposite directions, a driven wheel loosely mounted on said shaft and connected to the said planetary gears, connections between the driven wheel and the steering wheels, and means for operating said planetary gears to turn said driven wheel in one direction or the other.

9. In a steering gear for motor vehicles, the combination with the engine frame, an engine thereon, and steering wheels, of a rotatable shaft, two rotating members mounted on said shaft and geared positively to said shaft and to each other to rotate in opposite directions, means for holding stationary each of said rotating members respectively and a third rotating member geared positively to each of said first-mentioned rotating members and also to the steering wheels, and connections between the shaft and engine.

10. In a steering gear for motor vehicles, the combination with the engine frame, an engine thereon, and steering wheels, of a rotatable shaft, two rotating members mounted on said shaft and geared positively to said shaft and to each other to rotate in opposite directions, frictional means for partially or completely braking each of said rotating members respectively and a third rotating member geared positively to each of said first-mentioned rotating members and also to the steering wheels, and connections between the shaft and engine.

11. In a steering gear for motor vehicles, the combination with the engine frame, an engine thereon, and steering wheels, of a rotatable shaft, two rotating members mounted on said shaft and geared positively to said shaft and to each other to rotate in opposite directions, frictional means under the control of the operator for partially or completely braking each of said rotating members respectively and a third rotating member geared positively to each of said first-mentioned rotating members and also to the steering wheels, and connections between the shaft and engine.

12. In a steering gear for motor vehicles, the combination of a frame, vehicle supporting and driving wheels, suitable steering wheels, and power actuated steering devices connected to the said steering wheels including a system of planetary reversing gears adapted to turn the said steering wheels in one direction or another.

13. In a steering gear for motor vehicles, the combination of a frame, vehicle supporting and driving wheels, suitable steering wheels, power actuated steering devices including a system of planetary reversing gears, and manually operated means for controlling the said planetary gears to turn the steering wheels in one direction or another.

14. In a motor vehicle, the combination of a frame, vehicle supporting and driving wheels, steering wheels, a motor mounted upon the frame, power transmitting mechanism between said motor and said steering wheels for turning the wheels in one direction or another, two steering rods, one movably mounted within the other and each having a hand wheel within reach of the operator on the vehicle, connecting means whereby one of the steering rods may turn the steering wheels, and connecting means whereby the other rod may control the power transmitting mechanism between the motor and the steering wheels.

In testimony whereof I affix my signature, in presence of two witnesses.

GEORGE W. PERRY, Jr.

Witnesses:
  G. H. HERZOG,
  A. L. GREGORY.